United States Patent [19]

Tashiro et al.

[11] Patent Number: 4,998,199

[45] Date of Patent: * Mar. 5, 1991

[54] GAME MACHINE SYSTEM WITH MACHINE GROUPING FEATURE

[75] Inventors: Koichi Tashiro; Shinichiro Okamoto, both of Kawasaki; Tatsuro Okamoto, Yokohama, all of Japan

[73] Assignee: Namco Ltd., Japan

[*] Notice: The portion of the term of this patent subsequent to Sep. 25, 2007 has been disclaimed.

[21] Appl. No.: 250,542

[22] Filed: Sep. 29, 1988

[30] Foreign Application Priority Data

Oct. 2, 1987 [JP] Japan .............................. 62-250186
Oct. 2, 1987 [JP] Japan .............................. 62-250187

[51] Int. Cl.$^5$ ..................... G06F 15/44; A63F 9/22
[52] U.S. Cl. .................................. 364/410; 273/85 G
[58] Field of Search ............ 273/1 E, DIG. 28, 85 G, 273/148 B; 364/410, 411, 412

[56] References Cited

U.S. PATENT DOCUMENTS

| | | | |
|---|---|---|---|
| 4,572,509 | 2/1986 | Sitrick | 273/85 G |
| 4,593,904 | 6/1986 | Graves | 273/1 E |
| 4,738,451 | 4/1988 | Logg | 273/DIG. 28 X |
| 4,760,527 | 7/1988 | Sidley | 364/412 |

Primary Examiner—Clark A. Jablon
Attorney, Agent, or Firm—Oliff & Berridge

[57] ABSTRACT

A game playing system for business use includes a plurality of independent game machines and transmission lines for connecting the game machines together, each of the game machines including player input device through which a player can input a game start command signal, a communication interface for performing the reception and transmission of data between the one player's game machine and the other game machines through the transmission lines, a group setting device for grouping the game machines including the one player's game machine to participate in a game in accordance with the game start command signal from the player input device and various signals from the other game machines through the communication interface and a game calculating device for performing the reception and transmission of game data between the one player's game machine and the other game machines in the same group through the communication interface to make a predetermined calculation of game, whereby a plurality of game machines can be played simultaneously in the same game space.

11 Claims, 14 Drawing Sheets

CONCURRENT GAME
POSSIBLE.
PUT COIN INTO SLOT
AND DEPRESS START
BUTTON    TIME 10

FIG. 8

| | |
|---|---|
| PLAYER | #10-a |
| PLAYER | #10-b |
| PLAYER | #10-c |
| PLAYER | #10-d |
| PLAYER | #10-e |
| PLAYER | #10-f |
| PLAYER | #10-g |
| PLAYER | #10-h |
| COMPUTER | #1 |
| COMPUTER | #2 |
| COMPUTER | #3 |
| COMPUTER | #4 |
| COMPUTER | #5 |
| COMPUTER | #6 |
| COMPUTER | #7 |
| COMPUTER | #8 |
| COMPUTER | #9 |
| COMPUTER | #10 |
| COMPUTER | #11 |
| COMPUTER | #12 |
| COMPUTER | #13 |
| COMPUTER | #14 |
| COMPUTER | #15 |
| COMPUTER | #16 |

DATA OF CARS OPERATED BY PLAYERS (MAXIMUM OF EIGHT CARS)

DATA OF CARS OPERATED BY COMPUTER (MAXIMUM OF SIXTEEN CARS)

GAME MACHINE SYSTEM WITH MACHINE GROUPING FEATURE

BACKGROUND OF THE INVENTION

1. Field of the Invention

The present invention relates to a game playing system for business use and particularly to such a system enabling a plurality of players to play a game simultaneously in the same game space.

2. Description of the Prior Art

With spread of video games, various types of game machines have been developed and actually used. Almost all such game machines in the prior art are of a single-player type wherein only one player plays a game in a completely independent game space. Even where a plurality of identical game machines are installed in the same place, only one player can play a game with a computer as a companion.

To enjoy the game with further pleasure, it is desirable that a plurality of players can simultaneously play the corresponding number of game machines such as drive game machines together in the same game space to emulate each other as in driving technique.

To this end, the prior art has provided various types of multi-player game machines wherein a plurality of players can play the same game simultaneously in the same game space to increase the enjoyment of the game.

In the accompanying drawings, FIG. 17 exemplifies one of the prior art multi-player game machines, which is adapted to display a plurality of objects to be operated by the respective players in the same scene. The players can play the same game together in the same game space by manipulating control members 100A, 100B and 100C on a control panel, respectively.

As such a multi-player game machine, there is known "GUNTRET" commercially available from ARITA Company.

FIG. 18 shows another example of the prior art multi-player game machines, which comprises a plurality of independent display sections each having a control member 100A, 100B or 100C, each of the display section being adapted to display a game scene representative of the common game space.

Such a game machine includes, for example, "VS TENNIS" commercially available from NINTENDO.

In the prior art multi-player game machines, however, the number of players playable in the same game space is limited to the number of control members as shown by 100A, 100B and 100C since these control members are incorporated into one and the same game machine. In the case where the multi-player game machine has three control members as shown in FIGS. 17 and 18, therefore, only three players can play the same game simultaneously in the same game space.

Further, since the prior art multi-player game machines are constructed exclusively for multi-player games with a plurality of control members as shown by 100A, 100B and 100C and a display or displays being incorporated into only a single game machine, they are extremely expensive in comparison with other single-player game machines, resulting in limitation of the number of game machines which are to be installed for business use.

SUMMARY OF THE INVENTION

It is therefore an object of the present invention to provide a game playing system for business use in which a plurality of independent game machines each playable in the single-player game mode can be played also in the multi-player game mode in the same game space and particularly in such a manner that any number of groups is formed from the game machines with each group playable the same multi-player game.

To this end, the present invention provides a game playing system for business use which comprises a plurality of independent game machines and transmission lines connecting the game machines together, each of said game machines comprising player input means through which a player can input a game start command signal into his own game machine, a communication interface for performing the reception and transmission of data between one player's game machine and the other game machines through the transmission lines, group setting means for grouping the game machines, including the one player's game machine, to participate in a game within the same game space in accordance with the game start command signal from said player input means and various signals from the other game machines through the communication interface and game calculating means for performing the reception and transmission of game data between the one player's game machine and the other game machines through the communication interface to make a predetermined calculation of game, whereby the plurality of game machines can be played simultaneously in the same game space.

BRIEF DESCRIPTION OF THE DRAWINGS

FIG. 8 illustrates a set of transmission data received and transmitted between the game machines.

DETAILED DESCRIPTION OF THE PREFERRED EMBODIMENTS

Figure 1:
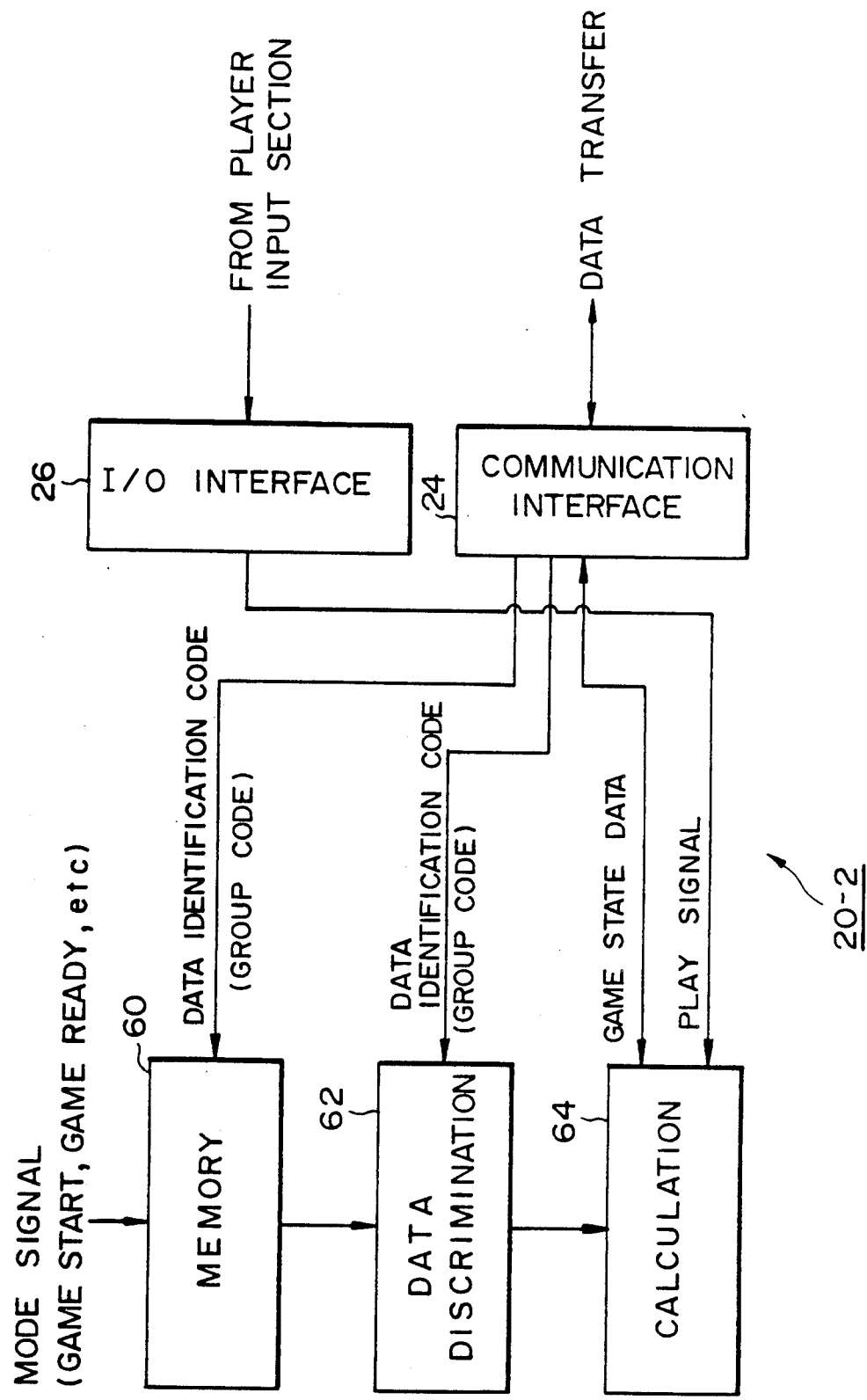
FIG. 1 is a block diagram of a game calculating section used in one embodiment of a game playing system constructed according to the present invention.

The present invention will now be described in connection with some preferred embodiments thereof illustrated in the drawings.

Figures 2, 5:
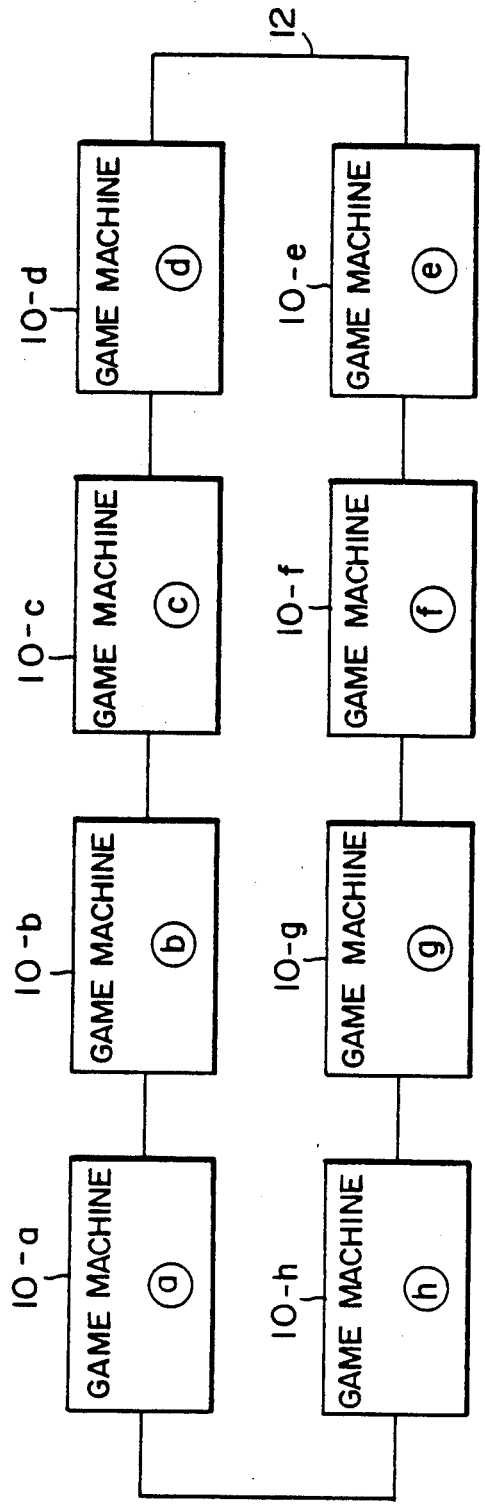
FIG. 2 exemplifies one arrangement of the present invention wherein a plurality of game machines are connected together into a loop.
FIG. 5 exemplifies a scene to be displayed in the game machines which are controlled in the game ready mode.

First Embodiment (a) Arrangement of the Entire System:

FIG. 2 shows the first preferred embodiment of the present invention.

In accordance with the first preferred embodiment, a game playing system for business use comprises a plurality of independent game machines 10-a, 10-b . . . . 10-h and data transmission lines 12 connecting the game machines together into a loop. Each of the game machines is adapted to transmit data relating to that game machine to the other game machines through the transmission line 12.

The transmission data includes game state data and data identification codes and are sent through the transmission line loop 12 while passing sequentially through the game machines in the clockwise direction.

The game state data are data representative of the progress of game in each of the game machines while the data identification code is used to specify a game machine 10 corresponding to the game state data.

One of the features of the present invention is that each of the game machines 10-a, 10-b . . . 10-h either can be played independently in the single-player game mode or can be played with the other game machines simultaneously within the same game space in the multi-player game mode.

(b) Game Machine

Figure 3:
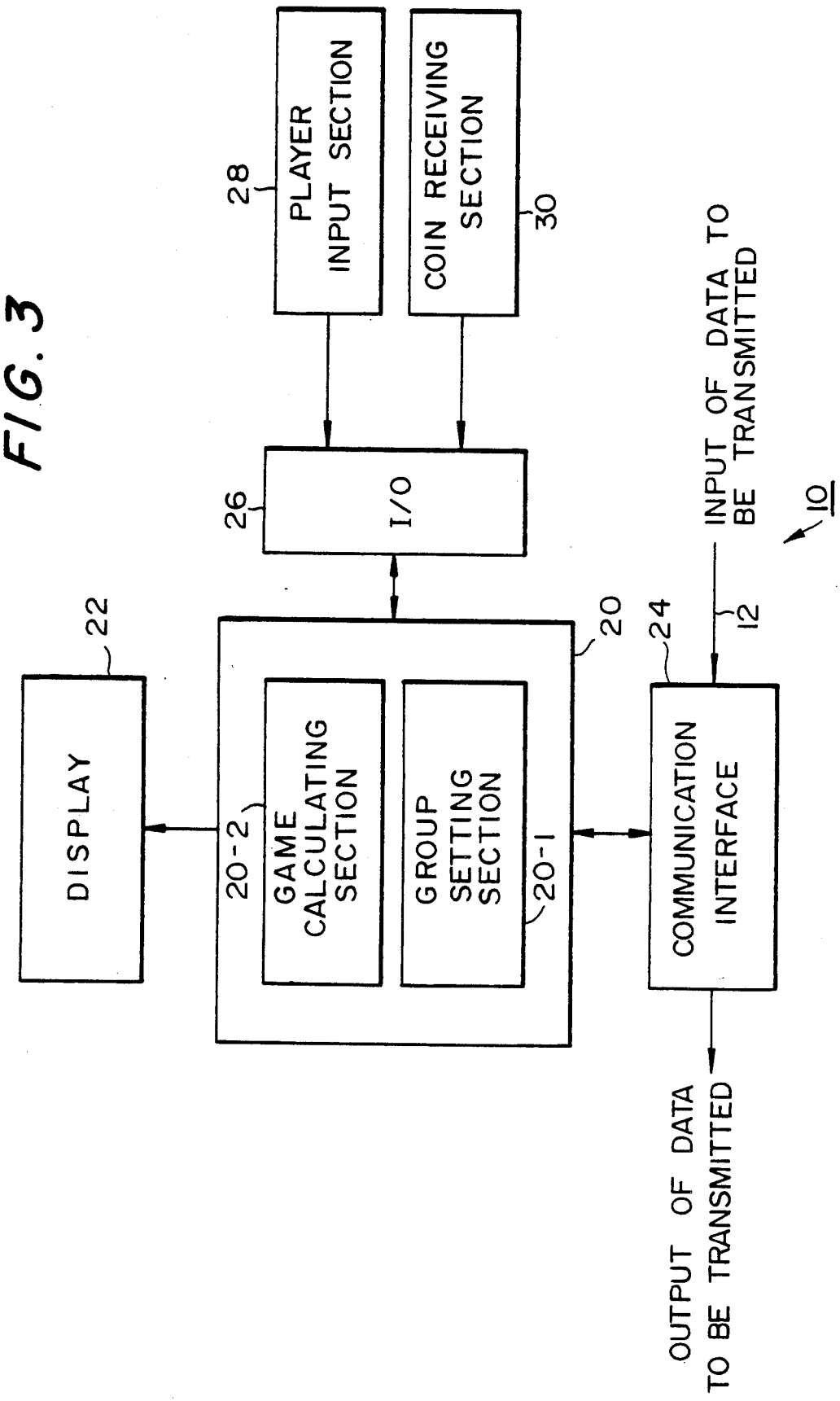
FIG. 3 is a block diagram of the concrete arrangement of each of the game machines shown in FIG. 2.

FIG. 3 shows the concrete arrangement of a game machine 10 usable in the first embodiment of the present invention.

The game machine 10 generally comprises a calculation and control section 20, a display 22, a communication interface 24, an input/output (I/O) interface 26, a player input section 28 and a coin receiving section 30.

The communication interface 24 is adapted to perform the reception and transmission of data between a one player's game machine and the other game machines through the transmission lines 12.

The calculation and control section 20 is adapted to perform various types of calculations in accordance with input signals from the player input section 28, coin receiving section 30 and I/O interface 26 and game data received and transmitted between the one player's game machine and the other game machines through the communication interface 24 of the one player's game machine, with the results being imaged on the display 22.

To make a multi-player game by the use of the independent game machines 10, it be required that a group is formed from the game machines 10 to participate in the multi-player game prior to the start of game.

When a group of three players starts playing a multi-player game by the use of three game machines among the eight game machines 10-a, 10-b . . . . 10-h shown in FIG. 2 and which are not placed in any game mode and if the remaining five game machines cannot be played, the working ratio of the entire game playing system would be degraded to reduce the working efficiency.

Another feature of the present invention is that a plurality of groups can be formed by a plurality of players through the game machines, each group being capable of playing a multi-player game.

To this end, the calculation and control section 20 may comprise a group setting section 20-1 for grouping a plurality of players into a plurality of groups as described above and a game calculating section 20-2 for performing a calculation of game after a group has been set.

Figure 4:
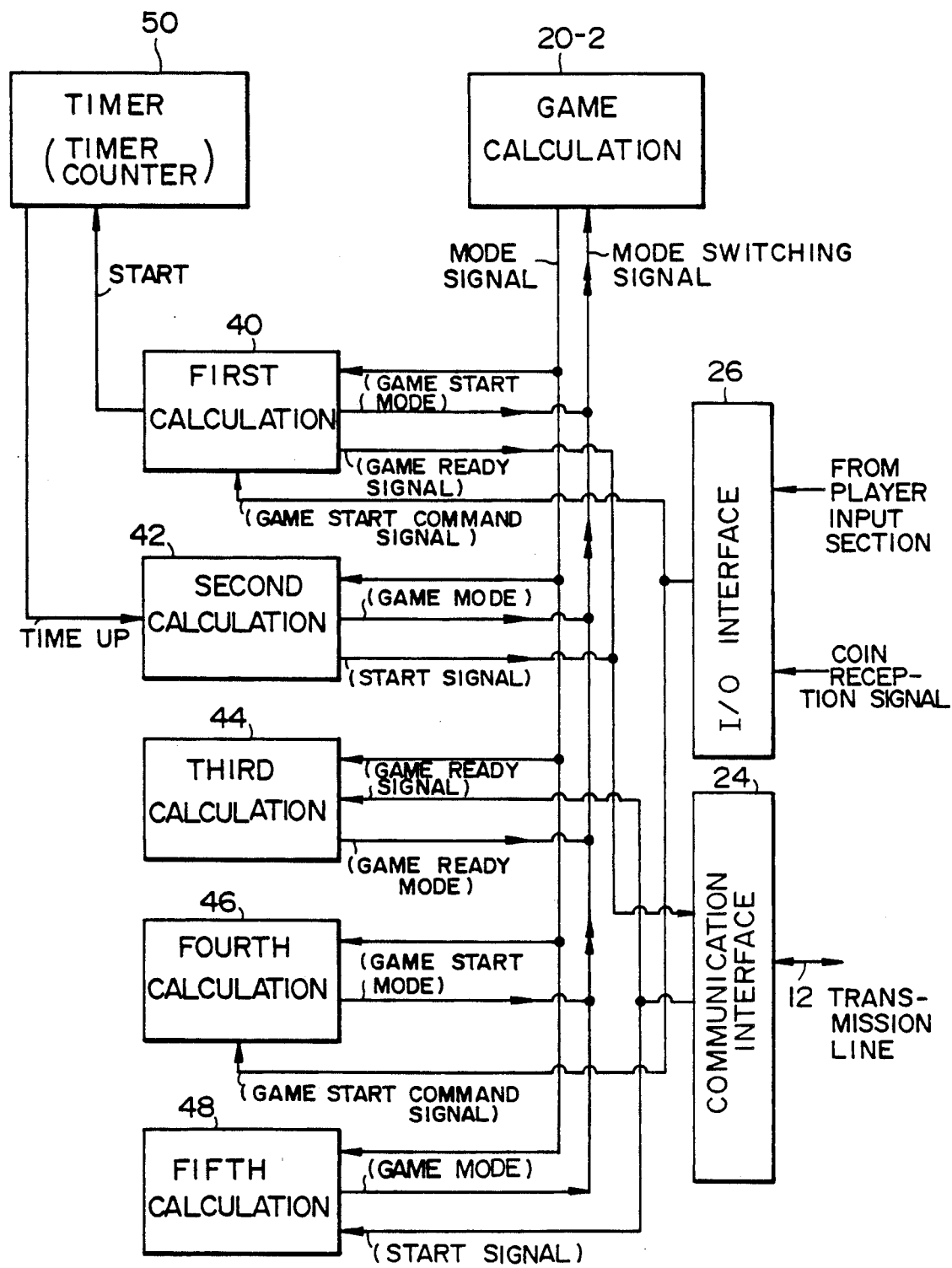
FIG. 4 is a block diagram of the concrete arrangement of the group setting section shown in FIG. 3.

(c) Group Setting Section:

FIG. 4 shows a concrete arrangement of such a group setting section 20-1 which comprises a first calculation means 40, a second calculation means 42, a third calculation means 44, a fourth calculation means 46, a fifth calculation means 48 and a timer 50.

The timer 50 includes a timer/counter which is adapted to time up after it has counted ten counts at each given time.

Figure 6:
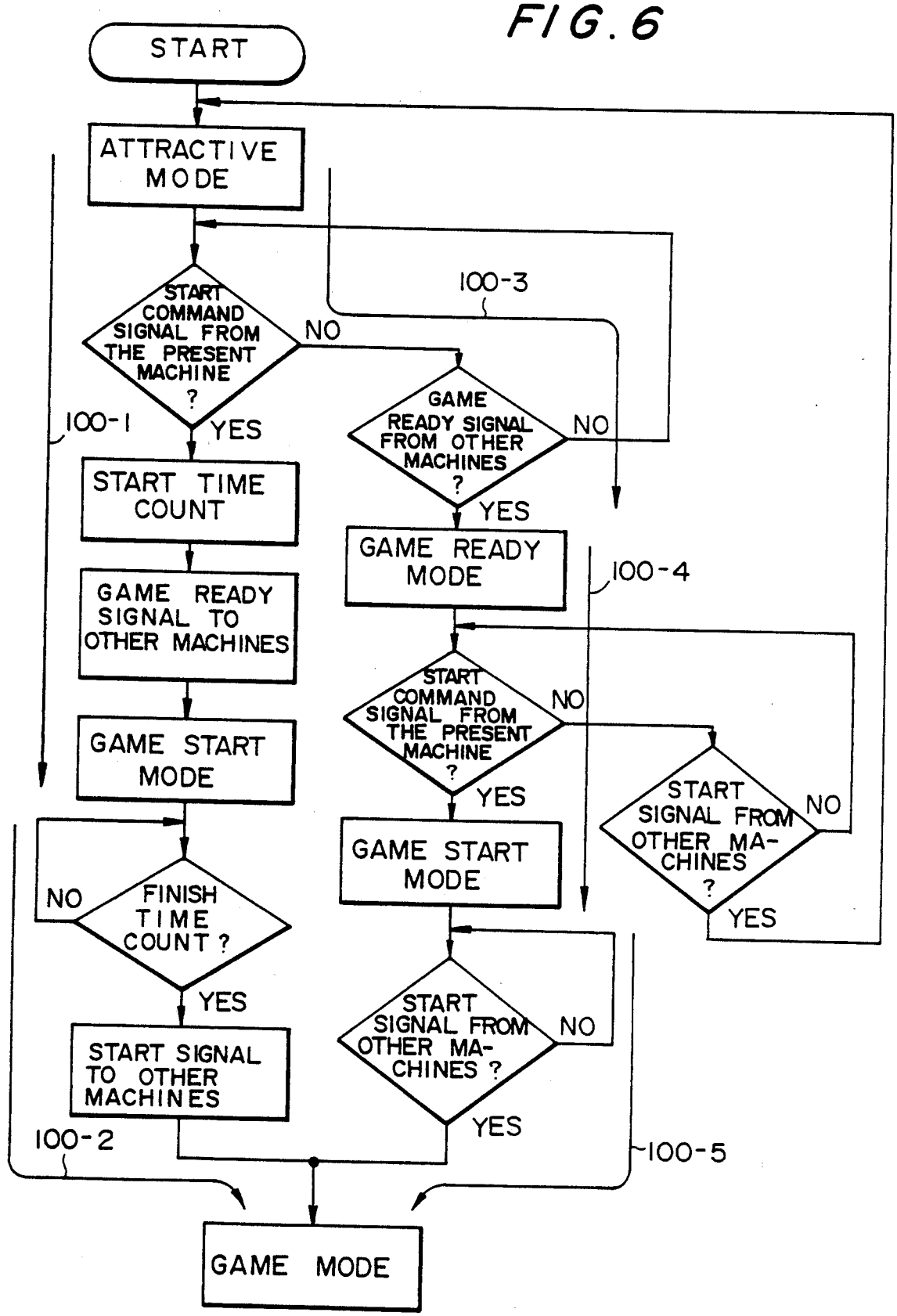
FIG. 6 is a flow chart illustrating the operation of the circuit shown in FIG. 4.

The first calculation means 40 is adapted to execute a program shown by a flow line 100-1 in FIG. 6.

More particularly, if a game start command signal is inputted into a one player's game machine by through its player input section 28 when the game calculating section 20-1 thereof is in the attractive mode, the timer 50 of this game machine is first started. At the same time, the first calculation means 40 switches the calculation mode in the game calculating section 202 from the attractive mode to the game start mode and also transmits a game ready signal to the other game machines 10 through the communication interface 24 and the transmission lines 12.

The second calculation means 42 is adapted to execute a program shown by a flow line 100-2 in FIG. 6.

The second calculation means 42 switches the calculation mode in the game calculating section 20-2 from the game start mode to the game mode if the timer 50 is timed up when the game calculating section 20-2 is in its game start mode. At the same time, the second calculation means 42 transmits a game start signal to the other game machines 10 through the communication interface 24 and the transmission lines 12.

The third calculation means 44 is adapted to execute a program shown by a flow line 100-3 in FIG. 6.

The third calculation means 44 switches the calculation mode in the game calculating section 20-2 from the attractive mode to the game ready mode if the one player's game machine receives a game ready signal from any one of the other game machines 10 when the game calculating section 20-2 is set at its attractive mode.

The fourth calculation means 44 is adapted to execute a program shown by a flow line 100-4 in FIG. 6.

The fourth calculation means 46 switches the calculation mode in the game calculating section 20-2 from the game ready mode to the game start mode if the one player's game machine receives a game start signal from the player input section 28 when the game calculating section 20-2 is in the game ready mode.

The fifth calculation means 48 is adapted to execute a program shown by a flow line 100-5 in FIG. 6:

The fifth calculation means 48 switches the calculation mode in the game calculating section 20-2 from the game start mode to the game mode if the one player's game machine receives a game start signal from any one of the other game machines 10 when the game calculating section 20-2 is set at its game start mode.

(d) Game Calculating Section

FIG. 1 also shows a concrete arrangement of circuit which may be used in the aforementioned game calculating section 20-2.

The game calculating section 20-2 comprises a memory 60, a data discriminating section 62 and a calculating and processing section 64.

The memory 60 is adapted to store data identification codes for all the game machines in the group to which the one player's game machine belongs, transmitted from the game machines through the transmission lines 12, prior to the start of game. Such data identification codes may be in the form of any suitable codes such as base numbers which have already been provided to each of game machines on shipping or random numbers which are generated by random-number generators contained in game machines.

At each reception of transmission data after the start of game, the data discriminating section 62 is adapted to compare a data identification code included in the transmission data with the data identification codes stored in the memory 60 to discriminate whether or not this transmission data is data relating to the group to which the one player's game machine belongs, with the discriminated result being then supplied to the calculating and processing section 64.

If the transmission data relates to the above group, the calculating and processing section 64 executes a calculating and processing operation of game in accordance with the game state data and transmits the same transmission data to the other game machines through the communication interface 24 and the transmission lines 12.

At this time, if the transmission data relates to the one player's game machine itself, the calculating and processing section 64 processes the game state data in accordance with the result from the above calculation to form new game state data which in turn is supplied to the other game machines.

If the transmission data relates to the group to which the one player's game machine belongs, but not to the one player's game machine, the calculating and processing section 64 processes the game state data depending on the contents of game or transmits the transmission data to the other game machines without execution of the aforementioned calculating and processing operation.

In such a manner, each of the game machines used in the first preferred embodiment of the present invention can perform the reception and transmission of the transmission data including the game state data representative of the progress of game in each game machine and the data identification code representative of each game machine corresponding to the respective game state data between such a game machine and the other game machines. Thus, all the game machines belonging to the same group can be played in the multi-player game mode under the same condition.

In accordance with the first embodiment, particularly, even though a plurality of groups are formed, for example, by the use of eight game machines 10-*a*, 10-*b* . . . 10-*h* as shown in FIG. 2, each group can play a multi-player game in the common game space. This can highly increase the efficiency of utilization in the entire system.

Concrete Example

There will now be described a concrete example in which the game playing system of the present invention is applied to a driving game.

Figure 7:
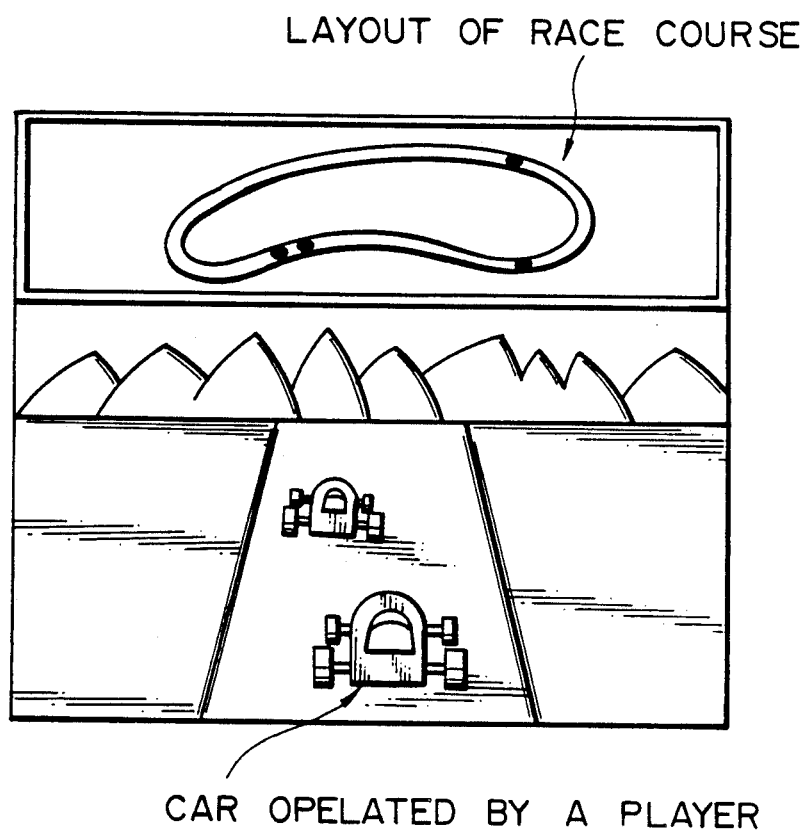
FIG. 7 exemplifies a game scene to be displayed in the respective one of driving game machines to which the present invention is applied.

The game playing system is adapted to play a car race by a maximum number of eight players and comprises eight game machines 10 each of which has a display 22 imaging one player's car as well as the other seven cars, as shown in FIG. 7.

The player input section 28 of each of the game machines 10 includes a start button, a steering wheel, a shift lever, an accelerating pedal, a braking pedal and so on.

In addition to the eight racing cars to be controlled by the players through the respective game machines 10, the game space for the game machines includes sixteen (16) cars to be controlled by a computer.

The driving game is set to extend a play time in each of the game machines belonging to the same group as a car controlled by a player through a game machine in the same-group reaches the goal within its own play time.

After repetition of such an extension of play time, the driving game is terminated as all of the remaining cars reaches the goal after they have rounded on the racing course by given times or if none of the cars can round on the racing course by given times within the initially set play time.

In the game playing system shown in FIG. 2, it is assumed that a set of transmission data shown in FIG. 8 are transmitted clockwise passing through the game machines along the transmission lines 12.

Since a scene in the normal video game is updated at each 1/60 seconds, the transmission speed is preferably set at a level corresponding to one round of the transmission data through the transmission line loop 12 in synchronism with the above updating time period.

The set of transmission data shown in FIG. 8 includes transmission data relating to the eight cars which are to be controlled by the players and to the sixteen cars which are to be controlled by the computer.

Figure 9:
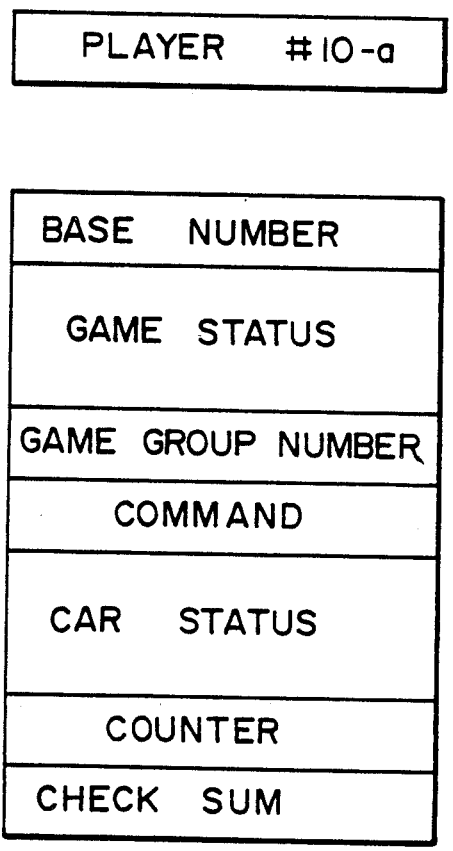
FIG. 9 illustrates transmission data relating to a car operated by a player.

FIG. 9 shows the details of the transmission data relating to the cars controlled by the players, which data includes base number, game status, game group number, command, car status, counter and check-sum.

Each of the base numbers is representative of a game machine 10 and provided by an output signal from a random-number generating section after power-on. Data relating to a game machine 10 having a base number can be distinguished from those of the other game machines. When the data is being transmitted along the transmission line loop, each of the game machines 10 may rewrite the contents of the transmission data if that game machine receives the transmission data corresponding to its own base number to take them as data relating to the game machine. It is naturally that this base number is stored in the game machine 10.

Where the base numbers are provided from the random numbers, one and the same base number may be created simultaneously for at least two game machines although the probability is extremely low. It is, therefore, preferred that any suitable means for inhibiting the same base number from creating relating to the two game machines or that ID codes are pre-programmed to provide different base numbers to all the game machines.

The game status is representative of which state a game machine 10 is presently in and includes, for example, data relating to the attractive mode, game ready mode, game mode, game over mode and so on.

The game group number is representative of the base numbers of all the game machines belonging to a group which has initiated to play a game simultaneously. The game group number data are provided on setting of the group.

The command data are in the form of various command data used to play one of the game machines in synchronism with the remaining game machines in the same group. The command data include, for example, a command for causing all the racing cars to start simultaneously or another command for causing the play time of the racing cars as a car in the same group is extended in play time.

Figure 11:
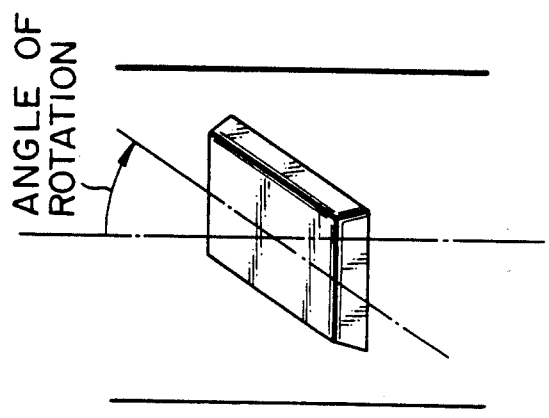
FIGS. 11(a) and 11(b) illustrate data used to specify the position of a running car.
Figure 11:
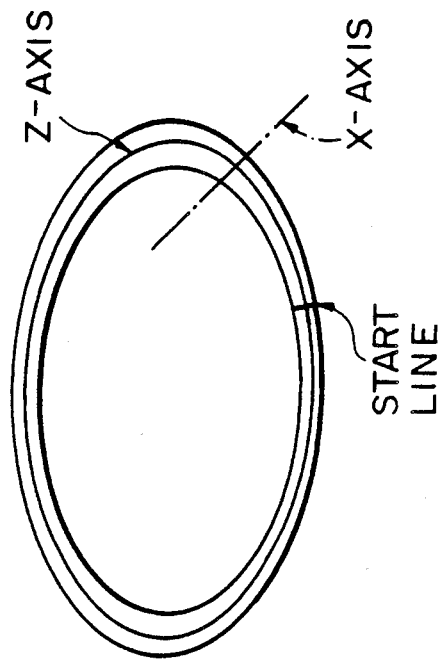

The car status is representative of data relating to the state of each of the cars, for example, such as the position of that running car. As shown in FIG. 11(a), for example, the position of the running car along the racing course is represented on Z-axis while the position of the running car in a direction perpendicular to the racing course is shown by X-axis. As shown in FIG. 11(b), further, the orientation of the car relative to the racing course is represented by a angle of rotation.

The counter is data which are counted up at each time when the transmission data passes through each of the game machines and cleared when the transmission data passes through each of the game machines.

In the system of FIG. 2, therefore, the count becomes a maximum value of eight which will not be exceeded under the normal operation of all the game machines 10.

If there is created any fault, for example, in a game machine 10-a during play of a game, the count may exceed eight since the count value included in the transmission data relating to that game machine 10-a will not be reset. It is, therefore, possible to detect any abnormal game machine by checking the aforementioned count value.

The check-sum is representative of the sum of data from the base numbers of the respective transmission data to the counter and can be used to check whether or not there is created any error in the respective one of the transmission data due to affection of noise and the like on communication.

Figure 10:
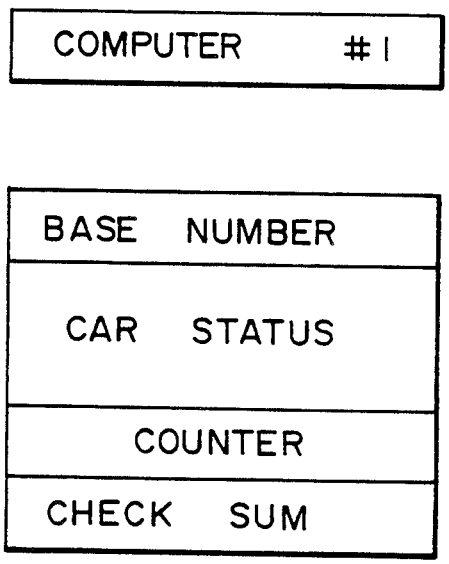
FIG. 10 illustrates transmission data relating to a car operated by a computer.

FIG. 10 shows a set of transmission data relating to a car controlled by the computer, including its base number, car status, counter and check-sum.

The data relating to the sixteen cars controlled by the computer, among the set of transmission data shown in FIG. 8, are calculated based on a top car among the cars controlled by the players.

If this top car is replaced by another car, the game machine 10 used to calculate the data relating to the sixteen cars controlled by the computer will also be changed by another game machine.

To this end, the transmission data relating to the cars controlled by the computer also include the base number and the counter as in those relating to the cars controlled by the players, as shown in FIG. 10.

Function

As all the game machines 10-a, 10-b ... 10-h shown in FIG. 2 are turned on, each game machine begins to execute its own test program and then informs the other game machines whether or not it is operable through the transmission lines 12. If any game machine 10 is not turned on or has a fault, its input and output are automatically by-passed with each other by means of a switch (not shown). Thus, the entire system will be operable even if there is any inoperative game machine. Such a checking will be periodically performed after turned on.

It is assumed herein that all the game machines 10-a, 10-b, 10-c . . . . 10-h are operative.

It is also assumed that after all the game machines have been energized, three game machines 10-a, 10-b and 10-c are to be played by three players. At this time, each of the game machines 10-a, 10-b and 10-c is in the attractive mode with its display 22 imaging a game scene calculated by the computer as an attractive scene.

As the game machine 10-a receives a coin from a player to receive a game start command signal through the player input section 28, this game machine 10-a is switched from the attractive mode to the game start mode and at the same time the timer 50 in the game machine 10-a begins to count. The game start mode is representative of a stand-by state before the start of game.

Simultaneously, the game machine 10-a transmits a game ready signal to the other game machines through the transmission lines 12.

Thus, all the remaining game machines 10-b, 10-c . . . 10-h are switched from the attractive mode to the game ready mode with each of the displays 22 thereof imaging, as a game ready scene, a confirmation message indicative of whether or not the corresponding game machine can play the multi-player game together with the game machine 10-a, as shown in FIG. 5.

While the game ready scene is being displayed, the other two players must put coins into the respective game machines (for example, 10-b and 10-h) to provide game start command signals through the respective player input sections 28. If so done, each of the game machines 10-b and 10 h is switched from the game ready mode to the game start mode so that they will be capable of being played in the same game space as the game machine 10-a.

Since the game is initiated as the timer 50 in the game machine 10-a is counted down to zero, the game machines 10-b and 10-h cannot be played under the same condition as the game machine 10-a unless the players facing the game machines 10-b and 10-h put the coins thereinto to provide the game start command signals before termination of the count-down in the timer 50.

As the timer 50 of the game machine 10-a is counted down to zero after all the three game machines 10-a, 10-b and 10-h have been set at the game start mode, the game machine 10-a transmits a game start signal to the other game machines 10-b and 10-h. In such a manner, the game machines 10-a, 10-b and 10-h will be started simultaneously.

The transmission data relating to the game machines 10-a, 10-b and 10-h among the set of transmission data shown in FIG. 8 are provided, at their game group number areas, base numbers in the same group.

While the transmission data are being transmitted through the transmission lines, therefore, the base numbers of the game machines belonging to the same group are provided to the game machines 10-a, 10-b and 10-h as data identification codes.

In accordance with the present embodiment, thus, the three game machines 10-a, 10-b and 10-h can be played in the multi-player mode under the same condition within the same game space.

After started, the three game machines 10-a, 10-b and 10-h take in the data of FIG. 8 on each reception in synchronism with the updating cycle of the video game scene. Each of the game machines performs a calculation of game and displays game scenes on its display 22 in accordance with game state data included in the transmission data for the group to which the game machine belongs (in the present embodiment, car status data shown in FIG. 9).

If it is assumed that the cars controlled by the game machines 10-b and 10-h runs immediately ahead of the car controlled by the game machine 10-a, therefore, all these cars are imaged on the display of the game machine 10-a.

In such a manner, the three players can more enjoy the game by emulating each other in driving technique while viewing the cars imaged on the displays 22 of the game machines 10-a, 10-b and 10-h.

It is next assumed that other three players are to play three game machines 10-d, 10-e and 10-f during working of the first-mentioned three game machines 10-a, 10-b and 10-h.

For example, if the game machine 10-d receives a coin to provide a game start command signal through its player input section 28, the same game ready scene as described hereinbefore is imaged on the display 22 of each of the presently non-working game machines 10-c, 10-d, 10-e, 10-f and 10-g.

In addition, if the game machines 10-e and 10-f receive coins to generate game start command signals, this results in start of a multi-player game through the game machines 10-d, 10-e and 10-f under the same condition within the same game space.

At this time, the base numbers corresponding to the three game machines 10-d, 10-e and 10-f are written, as data identification codes, in the game group number areas of the transmission data corresponding to these game machines. Thus, the three game machines 10-d, 10-e and 10-f will be grouped into a different group from the first-mentioned group consisting of the game machines 10-a, 10-b and 10-h and can play another multi-player game.

In such a manner, the game playing system of the present embodiment permits each of plural groups to play a multi-player game under the same condition for each group.

Furthermore, it is assumed that a single player is to play the game machine 10-c. In such a case, he can solely enjoy a single-player game.

On termination of the game through the first-played game machines 10-a, 10-b and 10-h, five game machines 10-a, 10-b, 10-c, 10-g and 10-h will not work. These game machines can be re-started to play a further game in either of the multi-player or single-player game mode.

In such a manner, the game playing system of the present embodiment can be used to form some groups from a plurality of game machines 10-a, 10-b . . . . 10-h so that the groups of game machines can be started simultaneously within the same game space.

Since the reduction of working efficiency in the game playing system can be prevented and at the same time the games can be played simultaneously within the same game space under the same condition, the game can be more enjoyed in the same group.

It is further to be noted that in the present invention, the game machines 10 are interconnected together simply through the transmission lines 12. This means that the number of game machines can be increased or decreased in consideration of the space wherein the game machines are to be placed and others conditions.

Although the present invention has been described as to such an arrangement that the identification codes of all the game machines 10 in each group are written in the memory 60 shown in FIG. 1, it is not limited to this arrangement and may be applied to write group codes of the game machines 10 in each group into the memory 60 in place of the data identification codes.

For example, the group consisting of three game machines 10-a, 10-b and 10-c may be specified by a group code "A" while the other group consisting of three game machines 10-c, 10-e and 10-f may be assigned by another group code "B". These group codes may be written in the memory 60 of FIG. 1 and the game group number areas of FIG. 9.

As will be apparent from the foregoing, the first embodiment of the present invention can provides a game playing system utilizing a plurality of independent game machines each playable in the single-player mode, the game machines also playable in the multi-player mode, each of the game machines comprising a memory for storing a data identification code or a group code relating to the group to which the game machine belongs, data discriminating means for discriminating whether or not the transmission data relates to the group to which the game machine belongs and game calculating means for performing a calculation of game in accordance with the game state data, whereby any numbers of groups can be formed from the game machines interconnected to form a network, each group of game machines being playable in the multi-player game.

SECOND EMBODIMENT

The second embodiment of the present invention will be described below.

The second embodiment is characterized by that it utilizes a different circuit in place of the circuit of the group setting section 20-1 used in the first embodiment.

Figure 19:
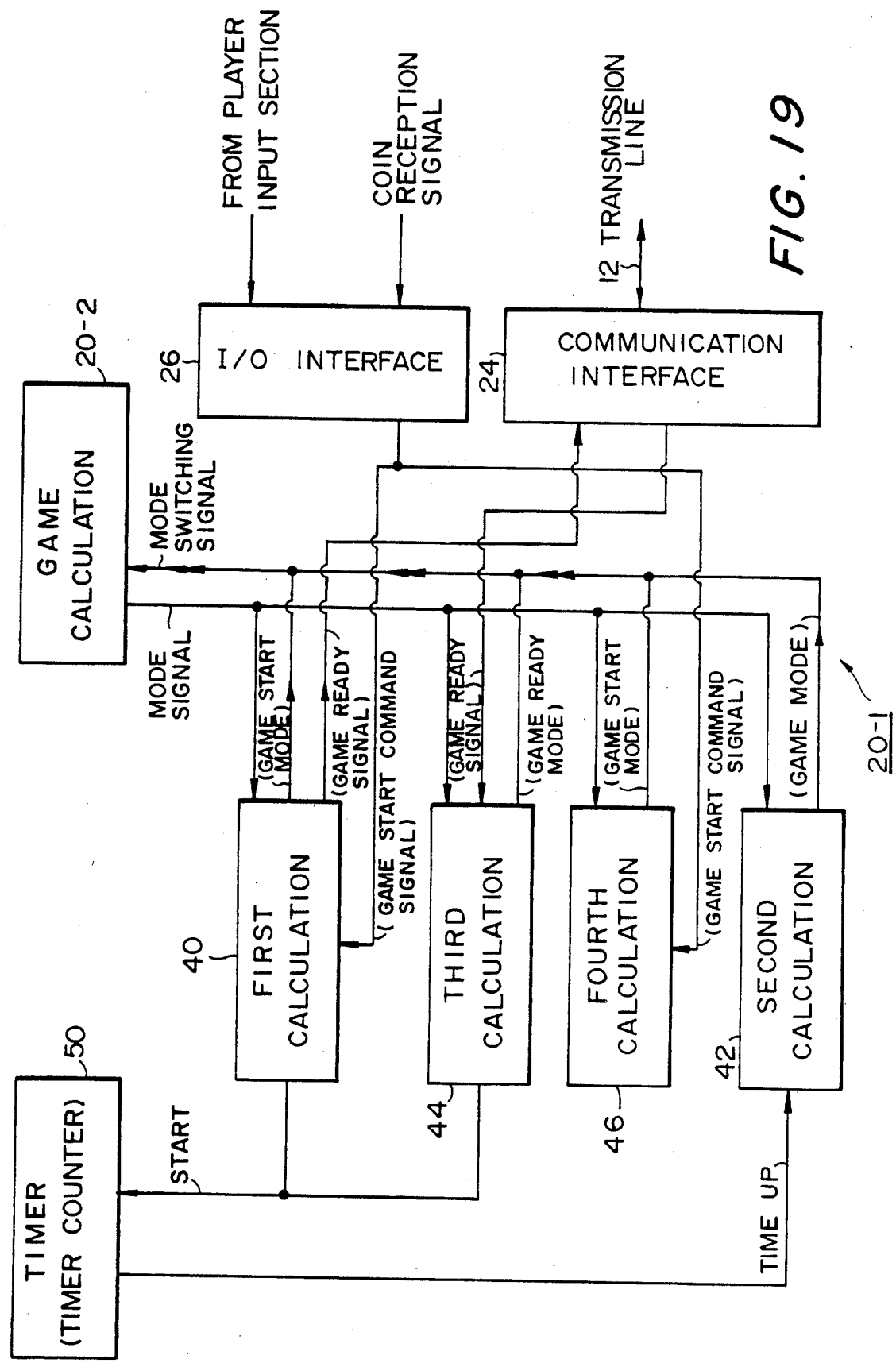
FIG. 19 is a block diagram of the other arrangement of a group setting section in a game machine used in the present invention.
Figure 20:
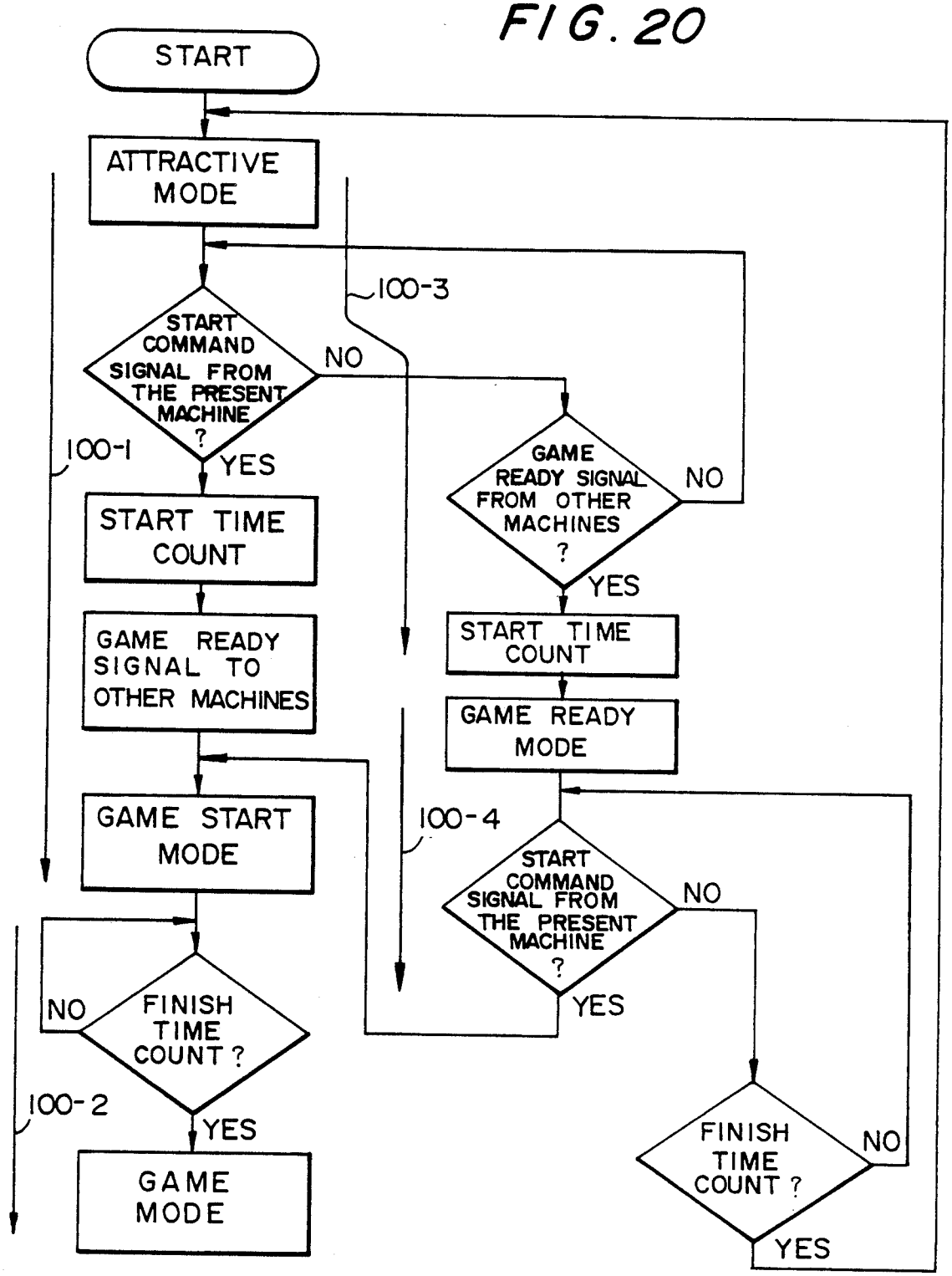
FIG. 20 is a flow chart illustrating the group setting section shown in FIG. 19.

FIG. 19 shows such a different circuit in the group setting section 20-1 while FIG. 20 is a flow chart illustrating the operation of the group setting section.

The second embodiment is further characterized in that the second and third calculation means 42, 44 therein are adapted to execute programs along flow lines 100-2 and 100-3 shown in FIG. 20.

More particularly, the second calculation means 42 is adapted to switch the calculation mode in the game calculating section 20-2 from the game start mode to the game mode if the timer 50 is timed up when the game calculating section 20-2 is in the game start mode.

The third calculation means 44 is adapted to start the timer 50 and to switch it from the attractive mode to the game ready mode if a one player's game machine receives a game ready signal from any one of the other game machines 10 when the one player's game machine is in the attractive mode.

In such a manner, the second embodiment is not required to have the fifth calculation means 48 which would otherwise be required in the first embodiment. Nevertheless, the second embodiment can set groups which can be started simultaneously to play multi-player games within the same game space.

OTHER EMBODIMENTS

Although the present invention has been described as to the transmission line loop 12 interconnecting the independent game machines 10, it is not limited to such an arrangement and may be applied to various types of other networks utilizing the transmission line.

Figure 12:
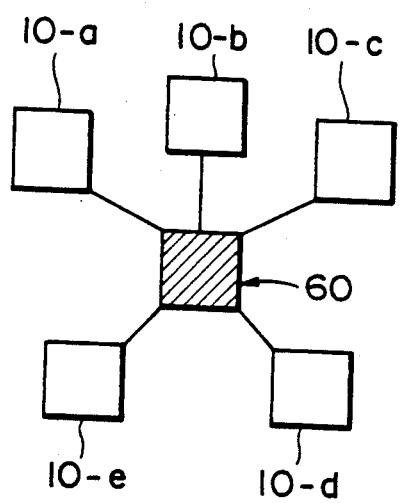
FIGS. 12 through 16 illustrate various types of networks between a plurality of game machines.

For example, the game machines 10 may be arranged to form a star-shaped layout about a central switching station 60, as shown in FIG. 12. The central station 60 preferably includes a central game calculating section 20-2 for controlling all game machines 10-a, 10-b . . . 10-e.

Figure 13:
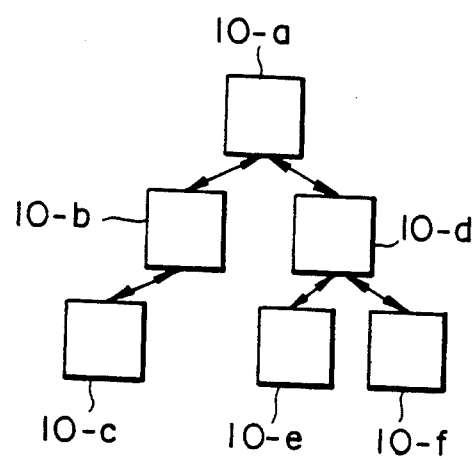
Figure 14:
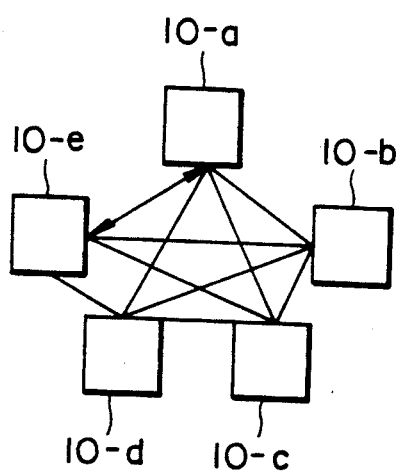
Figure 15:
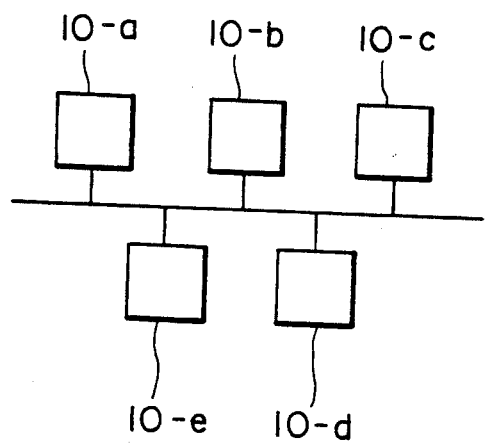
Figure 16:
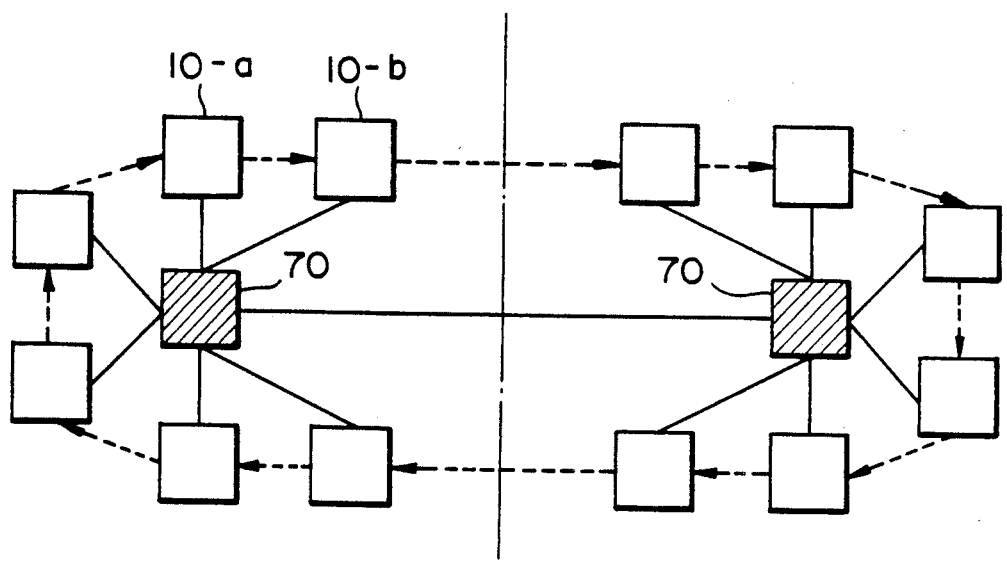
Figure 17:
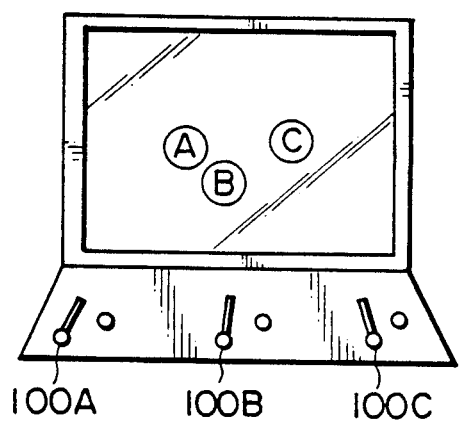
FIGS. 17 and 18 illustrate multi-player game machines in the prior art.
Figure 18:
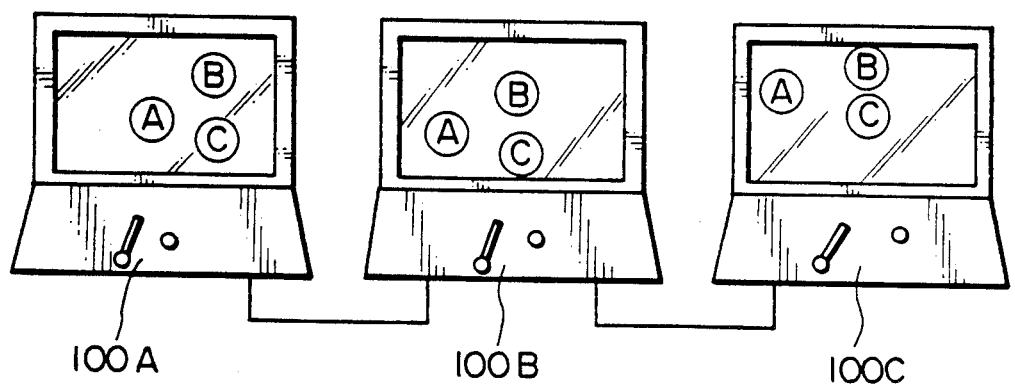

A plurality of independent game machines 10-a, 10-b . . . . 10-f may be interconnected to form a tree-like network as shown in FIG. 13. FIG. 14 shows a mesh-like network formed by a plurality of independent game machines 10-a through 10-e. FIG. 15 shows a network consisting of a plurality of game machines 10-a through 10-e interconnected through a bus. Finally, FIG. 16 shows a network consisting of a combination of star-like networks each having a central switching station 70 with a loop-like network.

Although the present invention has been described as to the multi-player driving game, it is not limited to this and may be applied to various types of multi-player games, for example, such as sport games for causing a plurality of players to cooperate or emulate in the multi-player game mode, roll playing games for causing a plurality of players to play a chasing game, a hide-and-seek game or a shooting game and so on.

In accordance with the present invention, a group of game machines can image, on their displays, objects (for example, racing cars) to be controlled by another group of game machines. In such a case, a larger number of players can enjoy the multi-player game by extending the limit time of the game, ranking the players and performing other plans for each group.

On the contrary, the present invention may be applied to arrange one group of game machines completely independently of the other groups of game machines without displaying objects to be controlled by the other groups. In such a case, players facing the one group of game machines can enjoy the multi-player game within the completely independent game space without affection from the external factors.

Although the present invention has been described as to the game playing system which utilizes a player input means consisting of the player input section 28 and the coin receiving section 30 and in which a game start signal is generated when the player input section 28 is actuated after the coin receiving section 30 has received a coin, the present invention is not limited to such an arrangement and may utilize any one of various known player input means, if required. For example, the coin receiving section 30 may act also as a player input means so that on reception of a coin, the coin receiving section 30 generates a game start signal. Furthermore, the player input means may include a combination of a card receiving section with the player input section 28. A game start signal will be generated when the player input section 28 is actuated after a card has been set in the card receiving section.

We claim:

1. A game playing system comprising a plurality of independent game machines, and transmission lines connecting said game machines together, each of said independent game machines comprising:
   player input means through which a player inputs a game start command signal into his own game machine;
   a communication interface for permitting the reception and transmission of data between one player's game machine and the other game machines through said transmission lines;
   group setting means for grouping the game machines, including the one player's game machine, to participate in a game within the same game space in accordance with the game start command signal from said player input means and game ready signals from the other game machines through said communication interface; and
   game calculating means for performing the reception and transmission of game data between the one player's game machine and the grouped other game machines through said communication interface to make a predetermined calculation with respect to said game, whereby said plurality of independent game machines cam be played simultaneously within the same game space;
   wherein each of said independent game machines is selectively switchable into one of a plurality of modes responsive to said group setting means, said plurality of modes comprising:
   an attractive mode in which the one player's game machine is adapted to calculate a scene for demonstration and in which, when the game machine receives the game start command signal from said player input means, the former outputs a game ready signal toward the other game machines through said communication interface;
   a game start mode in which, after the one player's game machine has received the game start command signal from said player input means, the former is placed at its stand-by position for a given time period;
   a game ready mode in which, when the one player's game machine receives a game ready signal from any one or more of the other game machines through said communication interface, a confirmation message of whether or not the one player's game machine participates in the multi-player game is calculated and outputted;
   a game mode in which a calculation for the actual game is executed after the game has been started;
   wherein said group setting means of the one player's game machine sets a group of said independent game machines to play a game responsive to said game start command signal from the one player's game machine and said game ready signals from at lease one other game machine and wherein said group setting means of the one player's game machine selectively switches the one player's game machine between said plurality of modes responsive to said game start command signal from said player input means, said game start command signal switching the one player's game machine from said attractive mode or said game ready mode to said game start mode, and said game ready signals from the the other game machines, said game ready signals switching the one player's game machine from said attractive mode to said game ready mode.

2. A game playing system as defined in claim 1, wherein said group setting means comprises:
   game start timer means;
   a first calculation means for driving said timer means and switching its own calculation mode from the attractive mode to the game start mode when the game start command signal is inputted thereinto from said player input means in the attractive mode and for transmitting the game ready signal to the other game machines;
   a second calculation means for switching its own calculation mode from the game start mode to the game mode when said timer means is timed up in the game start mode and for transmitting the game start signal to the other game machines;

a third calculation means for switching its own calculation mode from the attractive mode to the game ready mode when the game ready signal is inputted thereinto from any one of the other game machines in the attractive mode;

a fourth calculation means for switching its own calculation mode from the game ready mode to the game start mode when the game start command signal is inputted thereinto from said player input means in the game ready mode; and a fifth calculation means for switching its own calculation mode from the game start mode to the game mode when the game start signal is inputted thereinto from any one of the other game machines in the game start mode, whereby said plurality of independent game machines interconnected together through said transmission lines are started simultaneously in the same game space.

3. A game playing system as defined in claim 1, wherein said group setting means comprises:
game start timer means;
a first calculation means for driving said timer means and switching its own calculation mode from the attractive mode to the game start mode when the game start command signal is inputted thereinto from said player input means in the attractive mode and for transmitting the game ready signal to the other game machines;
a second calculation means for switching its own calculation mode from the game start mode to the game mode when said timer means is timed up in the game start mode;
a third calculation means for driving said timer means and at the same time switching its own calculation mode from the attractive mode to the game ready mode when the game ready signal is inputted thereinto from any one of the other game machines in the attractive mode; and
a fourth calculation means for switching its own calculation mode from the game ready mode to the game start mode when the game start command signal is inputted thereinto from said player input means in the game ready mode, whereby said plurality of independent game machines interconnected together through said transmission lines are started simultaneously in the same game space.

4. A game playing system as defined in claim 1, wherein said game calculating means comprises:
a memory for storing data identification codes for all the game machines of a group to which the one player's game machine belongs, prior to the start of game;
data discrimination means for, at each time when data is transmitted into said data discrimination means, comparing a data identification code included in said transmitted data with the corresponding code stored in said memory to discriminate whether or not said transmitted data are data for the group to which the one player's game machine belongs; and
calculating and processing means for performing the calculating and processing of a game in accordance with that game state data if said transmitted data are those of the group to which the one player's game machine belongs,
the reception and transmission of the transmitted data including game state data representative of the progress of a game and a data identification code representative of a game machine corresponding to each of the game state data transmitted between the game machines through the transmission lines enabling players to form any one group of the game machines and to play a game simultaneously through the grouped game machines in the same game space.

5. A game playing system as defined in claim 4, wherein said calculating and processing means performs the calculating and processing of a game in accordance with the game state data to form new game state data when the transmitted data belongs to the one player's game machine, the new game state data being then transmitted to the other game machines through the communication lines, and wherein said calculating and processing means also performs the game state data if required to form further new game state data when the transmitted data belongs to the group including the one player's game machine, but does not relate to the one player's game machine itself, said further new game state data being then transmitted to the other game machines through said communication lines.

6. A game playing system as defined in claim 1, wherein said group setting means comprises:
game start timer means;
a first calculation means for driving said timer means and switching its own calculation mode from the attractive mode to the game start mode when the game start command signal is inputted thereinto from said player input means in the attractive mode and for transmitting the game ready signal to the other game machines;
a second calculation means for switching its own calculation mode from the game start mode to the game mode when said timer means is timed up in the game start mode and for transmitting the game start signal to the other game machines;
a third calculation means for switching its own calculation mode from the attractive mode to the game ready mode when the game ready signal is inputted thereinto from any one of the other game machines in the attractive mode;
a fourth calculation means for switching its own calculation mode from the game ready mode to the game start mode when the game start command signal is inputted thereinto from said player input means in the game ready mode; and
a fifth calculation means for switching its own calculation mode from the game start mode to the game mode when the game start signal is inputted thereinto from any one of the other game machines in the game start mode,
and wherein said game calculating means comprises:
a memory for storing data identification codes for all the game machines of a group to which the one player's game machine belongs, prior to the start of game;
data discrimination means for, at each time when data is transmitted into said data discrimination means, comparing a data identification code included in said transmitted data with the corresponding code stored in said memory to discriminate whether or not said transmitted data are data for the group to which the one player's game machine belongs;
and calculating and processing means for performing the calculating and processing of a game in accordance with that game state data if said transmitted data are those of the group to which the one player's game machine belongs;

the reception and transmission of the transmitted data including game state data representative of the progress of a game and a data identification code representative of a game machine corresponding to each of the game state data between the game machines through the transmission lines enabling players to play a game simultaneously through the grouped game machines in the same game space.

7. A game playing system as defined in claim 1, wherein said group setting means comprises:

game start timer means;

a first calculation means for driving said timer means and switching its own calculation mode from the attractive mode to the game start mode when the game start command signal is inputted thereinto from said player input means in the attractive mode and for transmitting the game ready signal to the other game machines;

a second calculation means for switching its own calculation mode from the game start mode to the game mode when said timer means is timed up in the game start mode;

a third calculation means for driving said timer means and at the same time switching its own calculation mode from the attractive mode to the game ready mode when the game ready signal is inputted thereinto from any one of the other game machines in the attractive mode; and a fourth calculation means for switching its own calculation mode from the game ready mode to the game start mode when the game start command signal is inputted thereinto from said player input means in the game ready mode, and wherein said game calculating means comprises:

a memory for storing data identification codes for all the game machines of a group to which the one player's game machine belongs, prior to the start of game;

data discrimination means for, at each time when data is transmitted into said data discrimination means, comparing a data identification code included in said transmitted data with the corresponding code stored in said memory to discriminate whether or not said transmitted data are data for the group to which the one player's game machine belongs; and calculating and processing means for performing the calculating and processing of a game in accordance with that game state data if said transmitted data are those of the group to which the one player's game machine belongs;

the reception and transmission of the transmitted data including game state data representative of the progress of a game and a data identification code representative of a game machine corresponding to each of the game state data between the game machines through the transmission lines enabling players to play a game simultaneously through the grouped game machines in the same game space.

8. A game playing system as defined in claim 1, wherein said game calculating means comprises:

a memory for storing a group codes for all the game machines of a group to which the one player's game machine belongs, prior to the start of game;

data discrimination means for, at each time when data is transmitted into said data discrimination means, comparing a group code included in said transmitted data with the corresponding group code stored in said memory to discriminate whether or not said transmitted data are data for the group to which the one player's game machine belongs;

and calculating and processing means for performing the calculating and processing of a game in accordance with that game state data if said transmitted data are those of the group to which the one player's game machine belongs, the reception and transmission of the transmitted data including game state data representative of the progress of a game and a data identification code representative of a game machine corresponding to each of the game state data between the game machines through the transmission lines enabling players to form any one group of the game machines and to play a game simultaneously through the grouped game machines in the same game space.

9. A game playing system as defined in claim 8, wherein said calculating and processing means performs the calculating and processing of a game in accordance wit the game state data to form new game state data when the transmitted data belongs to the group to which the one player's game machine belongs, the new game state data being then transmitted to the other game machines through the communication lines and wherein said calculating and processing means also performs the game state data if required to form further new game state data when the transmitted data belongs to the group including the one player's game machine, but does not relate to the one player's game machine itself, said further new game state data being then transmitted to the other game machines through said communication lines.

10. A game playing system as defined in claim 1, wherein said group setting means comprises:

game start timer means;

a first calculation means for driving said timer means and switching its own calculation mode from the attractive mode to the game start mode when the game start command signal is inputted thereinto from said player input means in the attractive mode and for transmitting the game ready signal to the other game machines;

a second calculation means for switching its own calculation mode from the game start mode to the game mode when said timer means is timed up in the game start mode and for transmitting the game start signal to the other game machines;

a third calculation means for switching its own calculation mode from the attractive mode to the game ready mode when the game ready signal is inputted thereinto from any one of the other game machines in the attractive mode;

a fourth calculation means for switching its own calculation mode from the game ready mode to the game start mode when the game start command signal is inputted thereinto from said player input means in the game ready mode; and a fifth calculation means for switching its own calculation mode from the game start mode to the game mode when the game start signal is inputted thereinto from any one of the other game machines in the game start mode, and wherein said game calculating means comprises:

a memory for storing group codes for all the game machines of a group to which the one player's game machine belongs, prior to the start of the game;

data discrimination means for, at each time when data is transmitted into said data discrimination means, comparing a group code included in said transmitted data with the corresponding group code stored in said memory to discriminate whether or not said transmitted data are data for the group to which the one player's game machine belongs; and calculating and processing means for performing the calculating and processing of a game in accordance with that game state data if said transmitted data are those of the group to which the one player's game machine belongs, the reception and transmission of the transmitted data including game state data representative of the progress of a game and a data identification code representative of a game machine corresponding to each of the game state data between the game machines through the transmission lines enabling players to play a game simultaneously through the grouped game machines in the same game space.

11. A game playing system as defined in claim 1, wherein said group setting means comprises:

game start timer means;

a first calculation means for driving said timer means and switching its own calculation mode from the attractive mode to the game start mode when the game start command signal is inputted thereinto from said player input means in the attractive mode and for transmitting the game ready signal to the other game machines;

a second calculation means for switching its own calculation mode from the game start mode to the game mode when said timer means is timed up in the game start mode;

a third calculation means for driving said timer means and at the same time switching its own calculation mode from the attractive mode to the game ready mode when the game ready signal is inputted thereinto from any one of the other game machine in the attractive mode; and a fourth calculation means for switching its own calculation mode from the game ready mode to the game start mode when the game start command signal is inputted thereinto from said player input means in the game ready mode, and wherein said game calculating means comprises:

a memory for storing a group code for each of all the game machines of a group to which the one player's game machine belongs, prior to the start of the game;

data discrimination means for, at each time when data is transmitted into said data discrimination means, comparing a group code included in said transmitted data with the corresponding group code stored in said memory to discriminate whether or not said transmitted data are data for the group to which the one player's game machine belongs; and calculating and processing means for performing the calculating and processing of a game in accordance with that game state data if said transmitted data are those of the group to which the one player's game machine belongs, the reception and transmission of the transmitted data including game state data representative of the progress of a game and a data identification code representative of a game machine corresponding to each of the game state data between the game machines through the transmission lines enabling players to play a game simultaneously through the grouped game machines in the same game space.

* * * * *